United States Patent [19]

Bianchi et al.

[11] Patent Number: 4,718,531

[45] Date of Patent: Jan. 12, 1988

[54] ELECTRICAL CONNECTOR PICK-UP STATION

[75] Inventors: Edward A. Bianchi, Hummelstown; Dallas E. Schlegel, Mechanicsburg, both of Pa.

[73] Assignee: AMP Incorporated, Harrisburg, Pa.

[21] Appl. No.: 833,314

[22] Filed: Feb. 24, 1986

[51] Int. Cl.[4] ...................... B65G 47/06; H05K 13/02
[52] U.S. Cl. ................................ 193/17; 193/2 R; 211/41; 269/43; 269/903; 414/224
[58] Field of Search ............... 414/224, 225, 778, 780, 414/330; 269/903, 43; 193/2 R, 17, 46; 29/760; 198/493; 211/41

[56] References Cited

U.S. PATENT DOCUMENTS

| | | | |
|---|---|---|---|
| 2,428,103 | 9/1947 | Vergobbi | 193/17 X |
| 3,390,488 | 8/1968 | Carpenter, Jr. et al. | 414/224 X |
| 3,874,404 | 4/1975 | Hurd | 198/493 X |
| 4,149,311 | 4/1979 | Benson et al. | 269/903 X |
| 4,250,615 | 2/1981 | Knuth et al. | 221/93 X |
| 4,423,815 | 1/1984 | Boissicat | 414/27 X |
| 4,439,917 | 4/1984 | Pearson | 29/760 X |
| 4,505,371 | 3/1985 | Krueger et al. | 198/493 X |
| 4,580,523 | 4/1986 | Sunaga et al. | 269/903 X |
| 4,599,026 | 7/1986 | Feiber et al. | 414/330 |
| 4,636,261 | 1/1987 | Spotts | 414/225 X |
| 4,641,741 | 2/1987 | Oura | 198/493 |

FOREIGN PATENT DOCUMENTS

198216  11/1984  Japan ......................... 414/131

Primary Examiner—Frank E. Werner
Assistant Examiner—Janice Krizek
Attorney, Agent, or Firm—Thomas G. Terrell

[57] ABSTRACT

An electrical connector pick-up station for use, for example, with a pick and place robot having a pick-up head for picking up electrical connectors and for placing them on a circuit board, comprises a base, upon which is mounted for tilting movement about a horizontal axis, a support frame for a magazine containing a supply of electrical connectors. A support surface for the magazine is provided nearest one end of the upper side of the frame and a connector locating comb is provided at the opposite end of the frame. Between the magazine support surface and the comb are ribs for guiding connectors from the magazine towards the comb. The ribs are spaced from the comb and the connectors are arranged to be guided between the ribs and the comb by guide slots in which terminal tails depending from the connectors engage. For loading the comb with connectors, the frame is tilted to a position in which the magazine is above the comb so that connectors from the magazine slide from the magazine and between the ribs to engage between the teeth of the comb whereby clamps are operated to hold the connectors whilst the frame is lowered to a horizontal pick-up position in which the connectors can be picked up by the robot pick-up head and in which position the clamps release the connectors.

8 Claims, 8 Drawing Figures

ELECTRICAL CONNECTOR PICK-UP STATION

This invention relates to an electrical connector pick-up station for use, for example, with a pick and place robot having a pick-up head for picking up electrical connectors from a pick-up station and placing them on a circuit board. Such a robot is described in column 2, line 50 to column 3, line 28 of the specification of U.S. patent application Ser. No. 663,790 filed on Oct. 23, 1984, now U.S. Pat. No. 4,611,846, which is incorporated herein by reference.

The connectors may be supplied to the user of the robot, in a magazine, made of, for example, a foam plastics material and which defines a row of parallel through channels each containing several connectors arranged in end to end relationship and being slidable along the channel.

The present invention is intended to provide a pick-up station for automatically transferring from such a magazine, each connector therein to a pick-up location at which the connector can be picked up by the pick-up head of the robot. Since pick and place robots operate to very close tolerances, under an assembly program, each connector must be precisely positioned at its pick-up location, if it is to be picked up by the head.

An electrical connector pick-up station according to the invention comprises: a base; a connector and connector supply magazine support frame mounted on said base, said frame being elongate and having a first end, a second end opposite thereto, and support surface means between said ends and remote from said base, said support surface means including a connector supporting first surface proximate to said first end of the frame and a connector supply magazine supporting second surface between said first surface and said second end of the frame; means connecting said frame to said base for pivotal movement between a connector pick-up first angular position in which said support surfaces are horizontal and a connector supply second angular position in which said frame is tilted so that said second end of said frame is raised above said first end thereof; first drive means for moving said support frame between its pick-up and its connector supply positions; ribs on said first surface defining a row of parallel, open ended, first channels, each for slidably receiving an elongate electrical connector and extending lengthwise of said support frame, said ribs being spaced from said first end of the support frame; a connector locating comb projecting from said first end of the support frame towards said ribs and being spaced therefrom; said comb defining a row of connector positioning notches each aligned with, and opening towards, one of said first channels; a plurality of connector guiding means each extending between each notch and the first channel that is aligned therewith; connector retaining means associated with each connector guide means and being movable between a connector retaining first position and a connector receiving second position; second drive means for moving said connector retaining means between their first and second positions; and means on said second supporting surface for locating adjacent to said first supporting surface, a connector supply magazine defining a row of parallel connector receiving second channels, with each second channel opening towards a respective first channel and being aligned therewith, said first drive means being actuable to move said support frame from its connector pick-up position to its connector supply position to cause a connector in each second channel to slide through the first channel that is aligned therewith and the leading end of the connector to be received in the notch that is aligned with said first channel, and subsequently to move said support frame to its connector pick-up position, said second drive means being actuable to move each connector retaining means to its first position upon the leading ends of the connectors being received in said notches and to move each retaining means to its connector receiving position upon said support frame being moved to its connector pick-up position.

Said first drive means may be actuable in accordance with the program of the robot and said second drive means may be actuable by limit switches sensitive to the movement of the connectors into the notches and to the movement of the support frame from its connector supply, to its pick-up position.

The support frame is repeatedly moved between its pick-up and its connector supply positions, until the connectors in the magazine have been exhausted, after which the magazine is removed from the second supporting surface, in the pick-up position of the support frame, and is replaced by a fully loaded magazine.

For a better understanding of the invention, reference will now be made by way of example to the accompanying drawings in which.

Figure 1:
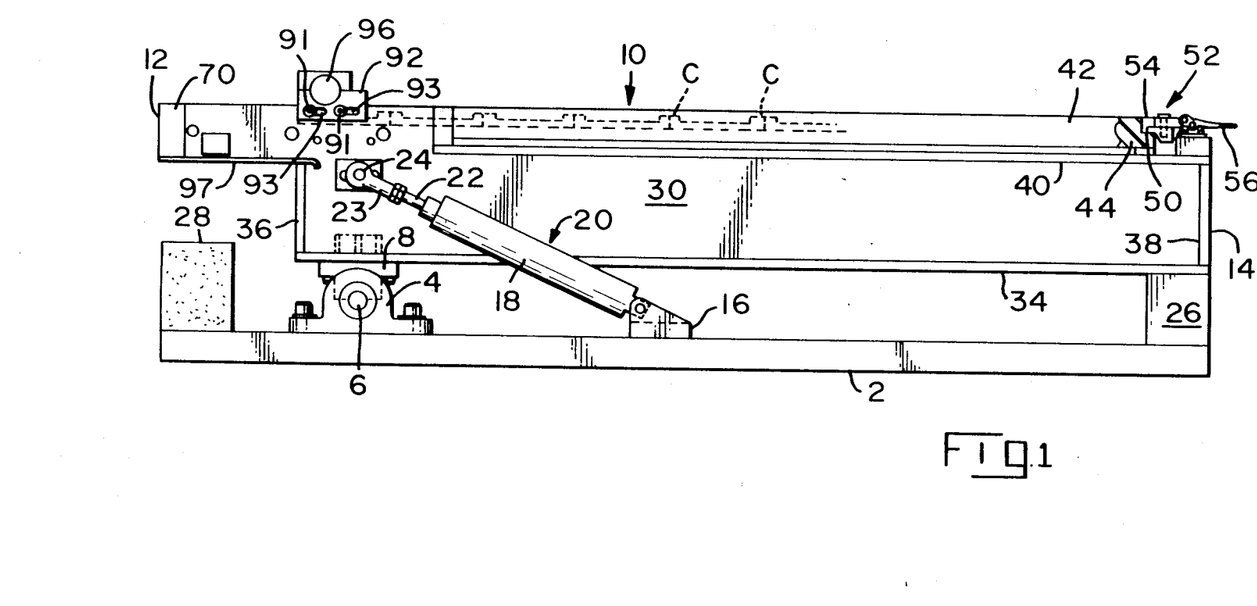
FIG. 1 is a side view of an electrical connector pick-up station comprising a connector, and connector supply magazine, support frame which is shown in a connector pick-up position.
Figure 2:
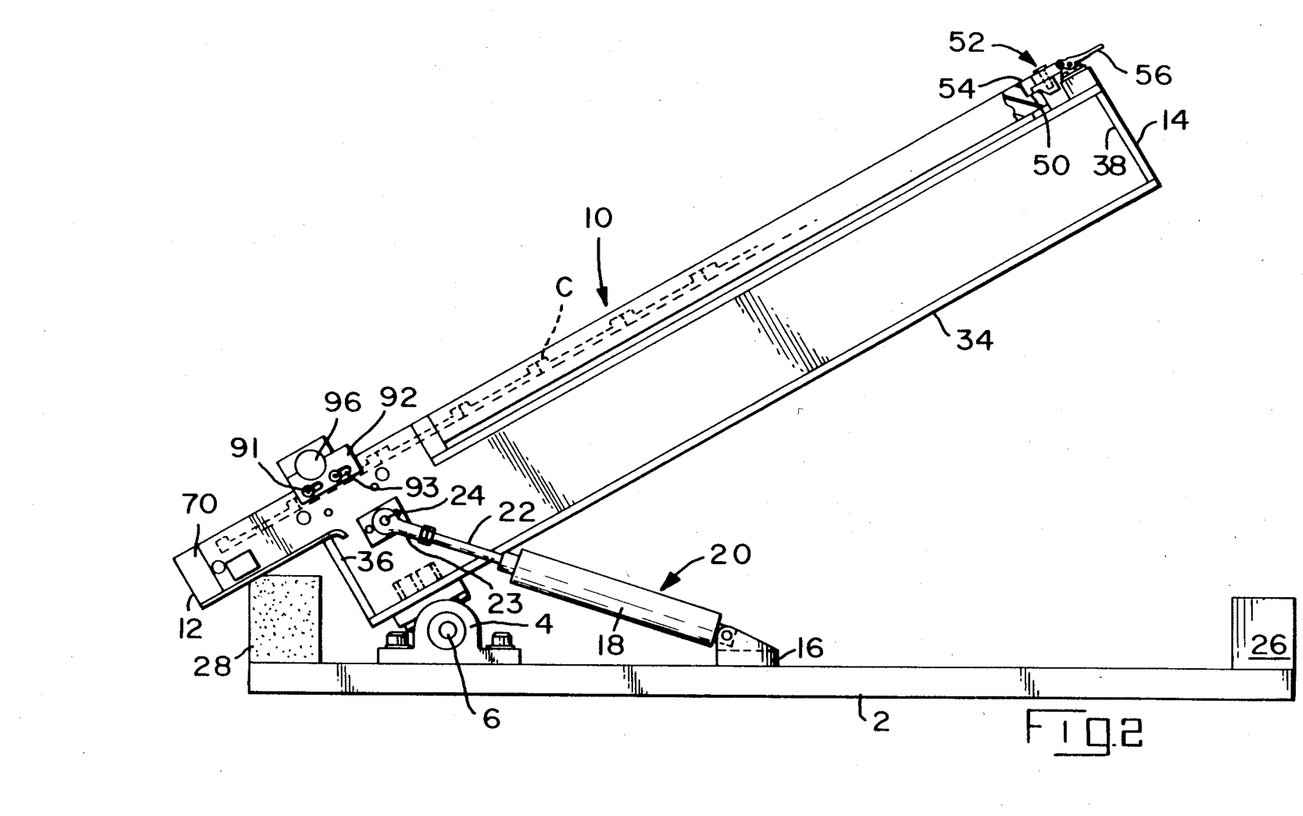
FIG. 2 is a similar view to that of FIG. 1 but showing the support frame in a connector supply position.
Figure 3:
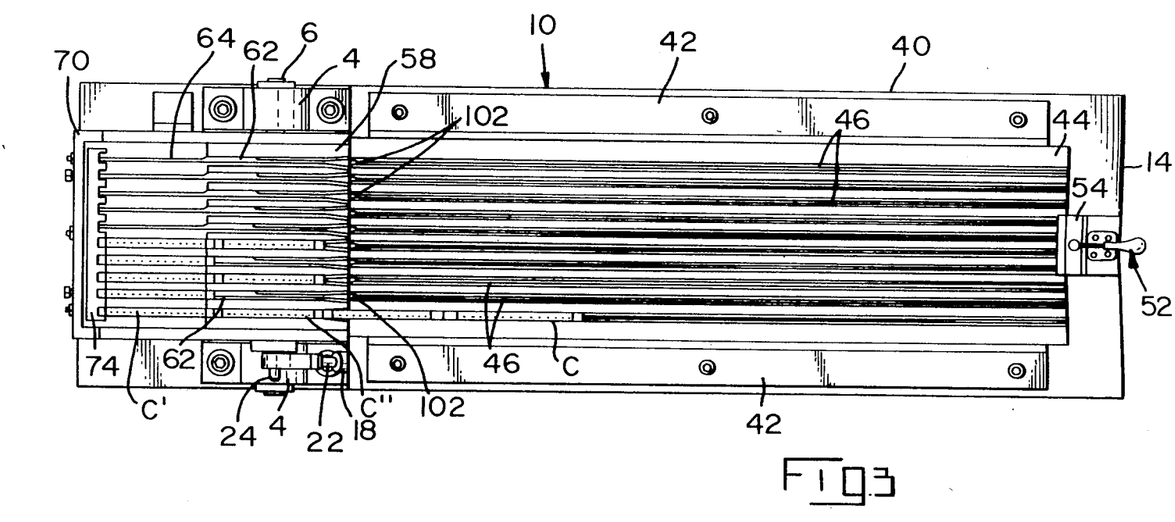
FIG. 3 is a plan view of FIG. 1, with parts removed.

The connector pick-up station comprises, as shown in FIGS. 1 to 3, a base 2 for mounting in a horizontal position in the work area of a pick and place robot. Near the lefthand (as seen in FIGS. 1 to 3) end of the base 2 are secured clevices 4 supporting a pivot pin 6 which is engaged by a rocker arm 8 secured to a connector, and connector supply magazine, elongate support frame 10 having a first end 12 and an opposite end 14 remote from the end 12. Also secured to the base 2 between the ends thereof, is another clevis 16 to which is pivotally connected the cylinder 18 of a pneumatic piston and cylinder unit 20 having a piston rod 22 terminating in an eye member 23 through which extends a shaft 24 secured to the frame 10 immediately above the pivot pin 6. As shown in FIG. 1, the frame 10 is supported proximate to its end 14, in a horizontal, connector pick-up, position, on a stop block 26 on the base 2, when the piston rod 22 is in a retracted position. The unit 20 is actuable to advance its piston rod 22, so as to tilt the frame 10 about the pivot pin 6, as shown in FIG. 2, to an extent limited by an elastomeric buffer 28 on the base 2, to a connector supply angular position in which the end 14 of the frame 10 is raised above its end 12.

Figure 5:
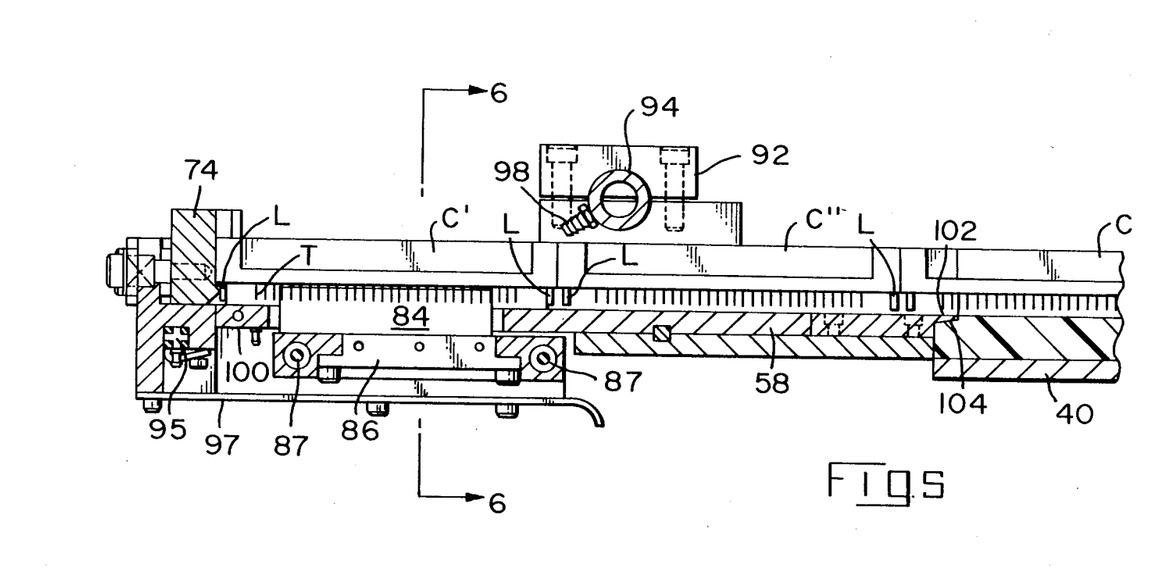
FIG. 5 is a view taken on the lines 5—5 of FIG. 4.
Figure 8:
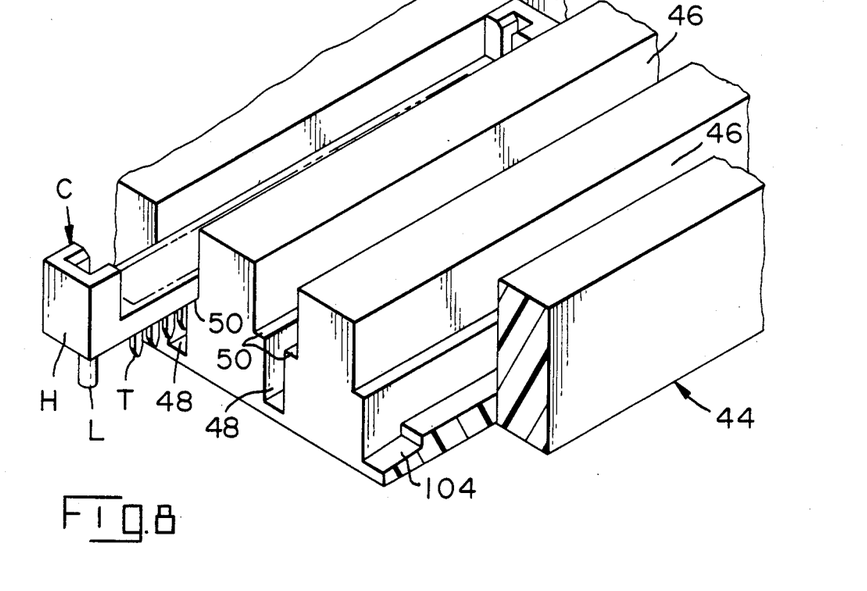
FIG. 8 is a fragmentary perspective view of an electrical connector supply magazine showing an electrical connector therein.

The frame 10 comprises side plates 30 and 32 to which are secured a base plate 34, a first front plate 36 and a rear plate 38. There is secured between the frame plates 30 and 32 a magazine support plate 40 to either side of which are secured magazine guide rails 42, for receiving between them an electrical connector supply magazine 44. As best seen in FIG. 8, the magazine 44 which is made of a foam plastics material, defines a row of parallel, open ended, connector receiving, channels 46 which extend lengthwise of the frame 10 when the magazine 44 is mounted thereon. Each channel 46 communicates with a central longitudinal slot 48 there beneath providing shoulders 50 extending longitudinally of the channel 46. Each channel 46 contains several elongate electrical connectors C arranged in end to end relationship. Each connector contains a row of electrical terminals each having a tail T projecting into the respective slot 48. At each end of each connector C is a mounting leg L aligned with the tails T (FIGS. 5 and 8). The legs L also project into the slots 48. The connectors C are slidable along the channels 46 on the shoulders 50. Mounted on the plate 40, proximate to the end 14 of the frame 10, is a toggle clamp 52 having a clamping arm 54 for engaging the shoulders 50 at the adjacent end of the magazine 44 as shown in FIG. 1. The clamp 52 has a handle 56 which can be depressed to lower the arm 54 into a clamping position and lifted to raise it to a release position.

Figure 4:
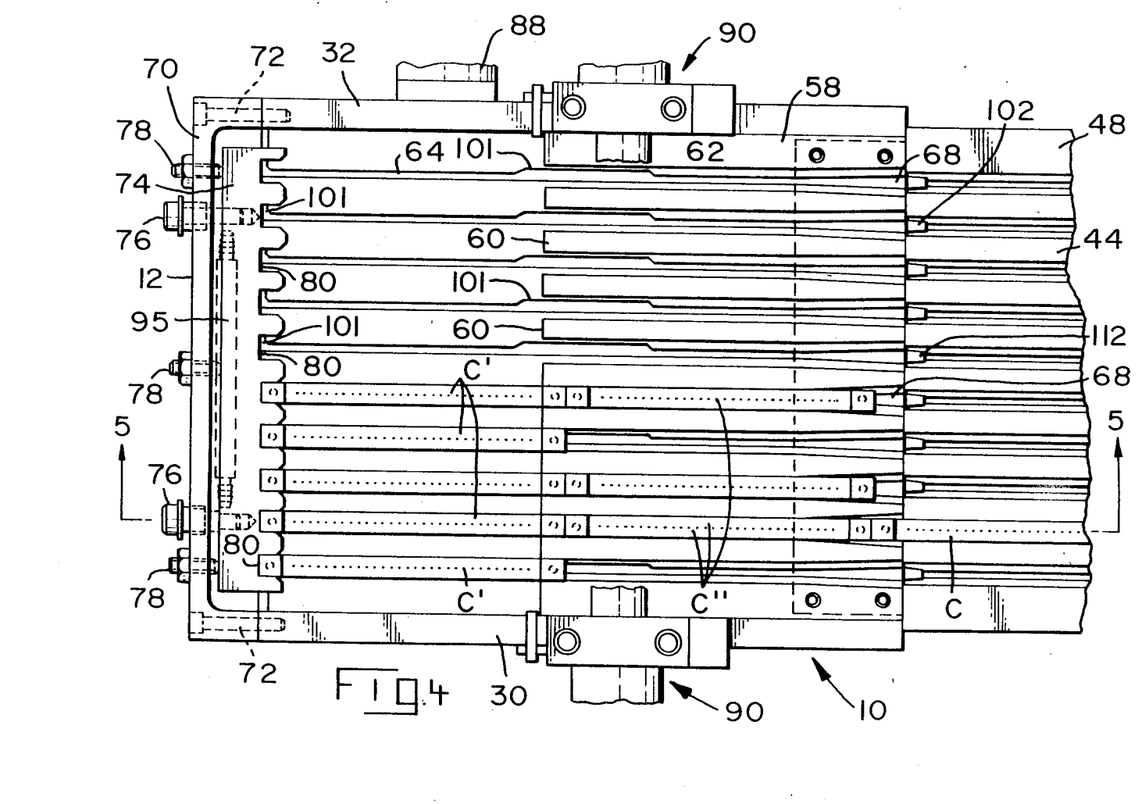
FIG. 4 is an enlarged fragmentary view illustrating details of FIG. 3.

Between the end 12 of the frame 10 and the plate 40, is a support plate 58 secured between the side plates 30 and 32. Ribs 60 on the plate 58 define a row of parallel, open ended, channels 62 of similar configuration to the channels 46 of the magazine 44 and each being aligned with one of the channels 46 when a magazine 44 is on the plate 40. The base of each channel 62 is formed with a longitudinal slot 64 extending into the plate 58 and providing connector supporting shoulders 66 level with the shoulders 50. As best seen in FIG. 4, each channel 62 has at its end adjacent to the plate 40, a flared, connector receiving mouth 68. The ribs 60 extend from the plate 40 towards the end 12 of the frame 10 by a distance which somewhat exceeds the length of a connector C, as will be apparent from FIG. 4. The slots 64, however, extend towards the end 12 beyond the ribs 60.

Figure 6:
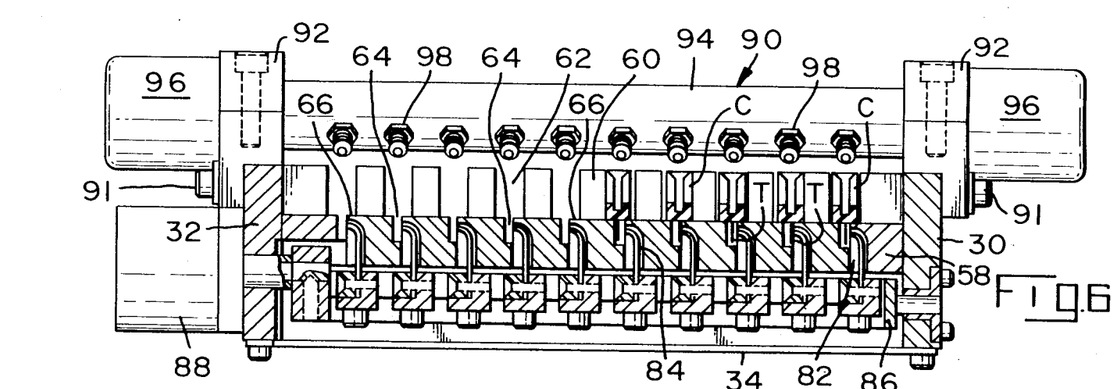
FIG. 6 is a view taken on the lines 6—6 of FIG. 5, showing connector retaining means of the support frame in a connector receiving position.
Figure 7:
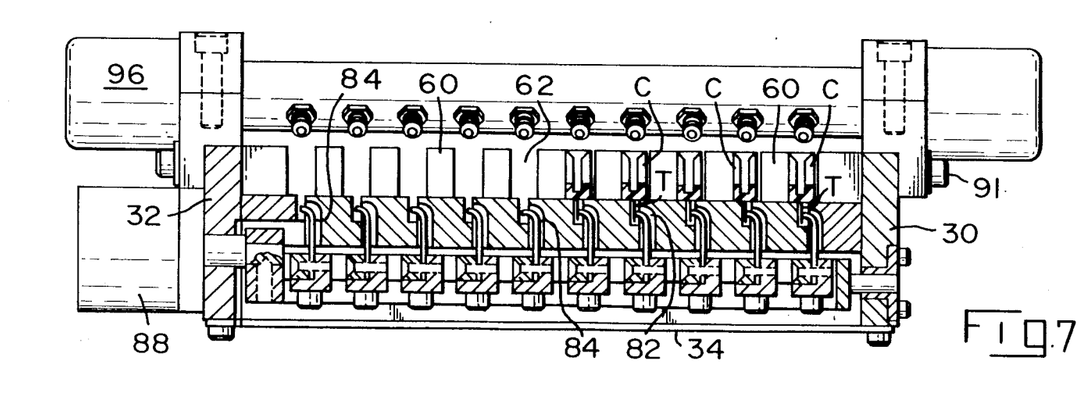
FIG. 7 is a similar view to that of FIG. 6 but showing the connector retaining means in a connector retaining position.

The side plates 30 and 32 extend beyond the first end plate 36 and are spanned by a second end plate 70 which is secured to the plates 30 and 32 by bolts 72. As best seen in FIG. 4, a connector locating comb 74 is attached to the plate 70 by means of fasteners 76, the position of the comb 74 being adjustable both longitudinally of the frame 10, and angularly with respect to the plate 70, by means of nut and bolt adjusting means 78. The comb 74 defines a row of notches 80 each aligned with a respective one of the channels 62 and so with a respective one of the slots 64. Between the ribs 60 and the comb 74, each channel 64 communicates with an opening 82, as shown in FIGS. 6 and 7, in the plate 58, into which opening 82 extends a connector retaining arm 84 secured to a slide 86 mounted on shafts 87 arranged for sliding movement in the plates 30 and 32; between a connector receiving first position (FIG. 6) in which the arms 84 are spaced from the tails T of connectors C, when said tails are received in the slots 64; and a connector retaining second position (FIG. 7) in which the arms 84 engage the tails T to hold the connectors C in position. The slide 86 is moved between its first and second positions by means of a solenoid (not shown) in a housing 88 secured to the plate 32.

A connector positioning air blast unit 90 is mounted, at a position adjacent to the ends of the ribs 60 nearest to the comb 74, on support plates 92 secured to the plates 30 and 32 by means of screws 91 extending through slots 93 (FIG. 1) in the plates 92 so that the position of the unit 90 can be adjusted lengthwise of the frame 10. The unit 90 comprises an air conduit 94 which is supplied by way of an air manifold 95 (FIG. 4) through air hoses (not shown). A guide plate 97 is provided for the inlet hose (not shown) to the manifold 95. There extend from the conduit 94 compressed air nozzles 98 each positioned above and opposite to, one of the channels 62 and being directed obliquely towards the comb 74 as shown in FIG. 5.

The angular position of the conduit 94 can be adjusted by means of end handle members (not shown) covered by caps 96. Beneath the comb 74 is a contact tail sensing device which is actuable by the leading tail T of a connector to cause the slide 86 to be moved to its connector retaining position by the said solenoid.

In operation, a magazine 44 is placed on the plate 40 and between the guides 42 with the arm 54 of the clamp 52 in its raised position and so that teeth 102 projecting from that end of the plate 58 which is nearest to the plate 40, engage in notches 104 formed in the bases of the slots 48 of the magazine 44, at its leading end. The arm 54 of the clamp 52 is then lowered by depressing the handle 56, to engage the magazine 44 which is thereby secured to the frame 10.

The unit 20 is then operated to advance its piston rod 22 so as to move the frame 10 from its FIG. 1 angular position, to its FIG. 2 angular position in which frame 10 is tilted with its end 12 lowermost, whereby (as illustrated in FIG. 4) each leading connector C′ in the magazine 44 slides, under the action of gravity, through a respective channel 62, and beyond the ribs 60, guided by the engagement of the tails T of the leading connector C in the respective slot 64, until the leading end of each leading connector C′ engages in a respective notch 80 of the comb 74 so as to be accurately located. At this time, the slide 86 is in its connector receiving position, so that the tails T of the connectors C pass the arms 84 on the slide 86. As soon as the leading tails T of the leading connectors C′ activate the switch 100, the slide 86 is moved to its connector retaining position, the legs L being received in rebates 101 in the sides of the slots 64.

The connectors are guided from the channels 46 into the channels 62 by the flared mouths 68 thereof, which thereby take up tolerance variations arising in the production of the magazine 44.

As the leading connectors C′ move towards the notches 80, they are followed by the next adjacent connectors C″ which enter the channels 60 and remain therein in abutment with the leading connectors shown in FIG. 4. The movement of the leading connectors C′ towards the comb 74 is assisted by compressed air issuing from the nozzles 98, the air streams issuing therefrom also serving to hold down the leading connectors C′ during their travel towards the comb 74.

The unit 20 is next actuated to lower the frame 10 to its horizontal, connector pick-up, FIG. 1 position in abutment with the stop block 26. Since, at this time, the slide 86 is in its connector retaining position, with the arms 84 thereon in engagement with the tails T of the leading connectors, the latter are not displaced from their accurately determined positions during the travel of the frame 10.

When the frame 10 has reached its FIG. 1 position, a limit switch (not shown) is operated to return the slide 86 to its connector receiving, FIG. 6, position. The frame 10 remains in its FIG. 1 position until the pick-up head of the pick and place robot has picked up each of the leading connectors C', these being accurately positioned for pick up, by the walls of the notches 80 and by the engagement of their tails T in the slots 64. When each of the leading connectors C' has been picked up, the frame 10 is returned to its FIG. 2 position, to cause the said next adjacent connectors C" to bottom in the notches 80 (for pick-up when the frame 10 has subsequently been moved to its FIG. 1 position), and to cause further connectors from the magazine 44 to be received in the channels 64.

When the supply of connectors in the magazine 44 has been exhausted, the frame 10 then being in its FIG. 1 position, the exhausted magazine 44 is removed from the frame 10 and is replaced by a full magazine.

Since the ribs 60 terminate at positions back from the comb 74, sufficient space is afforded between the leading connectors C', for the fingers of the pick-up head to engage both sides of each connector to be picked up.

What is claimed is:

1. An electrical connector pick-up station comprising:

a base;

a connector and connector supply magazine support frame mounted on said base, said frame being elongate and having a first end, a second end opposite thereto, and support surface means between said ends and remote from said base, said support surface means including a connector supporting first surface proximate to said first end of the frame and a connector supply magazine supporting second surface between said first surface and said second end of the frame;

means connecting said frame to said base for pivotal movement between a connector pick-up first angular position in which said support surfaces are horizontal and a connector supply second angular position in which said frame is tilted so that said second end of said frame is raised above said first end thereof;

first drive means for moving said support frame between its pick-up and its connector supply positions;

ribs on said first surface defining a row of parallel, open ended first channels each for slidably receiving an elongate electrical connector and extending lengthwise of said support frame, said ribs being spaced from said first end of the support frame;

a connector locating comb projecting from said first end of the support frame towards said ribs and being spaced therefrom, said comb defining a row of connector positioning notches each aligned with, and opening towards, a respective one of said first channels;

a plurality of connector guiding means each extending between each notch and the first channel that is aligned therewith;

connector retaining means associated with each connector guide means and being movable between a connector retaining first position and a connector receiving second position;

second drive means for moving said connector retaining means between their first and second positions; and means on said second supporting surface for locating adjacent to said first supporting surface, a connector supply magazine defining a row of parallel connector receiving second channels, with each second channel opening towards a respective first channel and being aligned therewith, said first drive means being actuable to move said support frame from its connector pick-up position to its connector supply position to cause a connector in each second channel to slide through the first channel that is aligned therewith and the leading end of the connector to be received in the notch that is aligned with said first channel, and subsequently to move said support frmae to its connector pick-up position, said second drive means being actuable to move each connector retaining means to its first position upon the leading ends of the connectors being received in said notches and to move each retaining means to its connector receiving position upon said support frame being moved to its connector pick-up position, wherein said ribs are provided on a support plate having teeth projecting therefrom towards said second end of the support frame for engagement in recesses in said magazine, means being provided at the second end of said support frame for releasably holding said magazine down on said second supporting surface when said teeth are engaged in said recesses.

2. A pick-up station as claimed in claim 1, wherein said first surface is formed with terminal tail receiving slots, each such slot extending from a respective one of said notches up to said second supporting surface, each slot intersecting the base of the first channel which is aligned with said notch.

3. A pick-up station as claimed in claim 2, wherein said connector retaining means comprises a series of connector retaining arms, each arm being movable into and out of a respective one of said slots at a position between said ribs and said comb.

4. A pick-up station as claimed in claim 3, wherein said arms are carried by a slide which is movable by said second drive means, transversely of said slots.

5. A pick-up station as claimed in claim 1, wherein said connector guide means comprise connector tail receiving slots extending between said first channels and said notches and air blast means positioned above said second supporting surface for holding said connectors down thereon.

6. A pick-up station as claimed in claim 1, wherein said base has means supporting a pivot pin at a position remote from said first end of the frame, said frame having a rocker engaging the pivot pin, a piston and cylinder unit connected to the base and to the support frame being actuable to tilt said frame between its connector pick-up and its connector supply, angular positions.

7. A pick-up station as claimed in claim 1, wherein said comb is connected to an end plate of said frame, means being provided for adjusting the position of said comb, both longitudinally of said frame and angularly with respect to said end plate.

8. An electrical connector pick-up station comprising:

a base;

a connector and connector supply magazine support frame mounted on said base, said frame being elongate and having a first end, a second end opposite thereto, and support surface means between said ends and remote from said base, said support surface means including a connector supporting first surface proximate to said first end of the frame and a connector supply magazine supporting second surface between said first surface and said second end of the frame;

means connecting said frame to said base for pivotal movement between a connector pick-up first angular position in which said support surfaces are horizontal and a connector supply second angular position in which said frame is tilted so that said second end of said frame is raised above said first end thereof;

first drive means for moving said support frame between its pick-up and its connector supply positions;

ribs on said first surface defining a row of parallel, open ended first channels each for slidably receiving an elongate electrical connector and extending lengthwise of said support frame, said ribs being spaced from said first end of the support frame;

a connector locating comb projecting from said first end of the support frame towards said ribs and being spaced therefrom, said comb defining a row of connector positioning notches each aligned with, and opening towards, a respective one of said first channels;

a plurality of connector guiding means each extending between each notch and the first channel that is aligned therewith;

connector retaining means associated with each connector guide means and being movable between a connector retaining first position and a connector receiving second position;

second drive means for moving said connector retaining means between their first and second positions; and means on said second supportng surface for releasably retaining and locating adjacent to said first supporting surface, a connector supply magazine defining a row of parallel connector receiving second channels, with each second channel opening towards a respective first channel and being aligned therewith, said first drive means being actuable to move said support frame from its connector pick-up position to its connector supply position to cause a connector in each second channel to slide through the first channel that is aligned therewith and the leading end of the connector to be received in the notch that is aligned with said first channel, and subsequently to move said support frame to its connector pick-up position, a connector sensing device being provided for actuating said second drive means to move each connector retaining means to its connector, retaining position upon said leading end of said connector being received in said notch, said ribs being provided on a support plate having teeth projecting therefrom towards said second end of the support frame for engagement in recesses in said magazine, means being provided at the second end of said support frame for releasably holding said magazine down on said second supporting surface when said teeth are engaged in said recesses.

* * * * *